ns

3,184,487
17-OXYGENATED 5α-ANDROSTAN-19-OLS AND ESTERS THEREOF

Raymond E. Counsell, Skokie, and Paul D. Klimstra, Northbrook, Ill., assignors to G. D. Searle & Co., Chicago, Ill., a corporation of Delaware
No Drawing. Filed Sept. 16, 1963, Ser. No. 309,287
13 Claims. (Cl. 260—397.4)

The invention disclosed herein is concerned with androstane derivatives characterized by an unsubstituted saturated A-ring and, in particular, with 17-oxygenated 5α-androstan-19-ols and the lower alkanoyl esters thereof, said compounds encompassed by the following structural representations

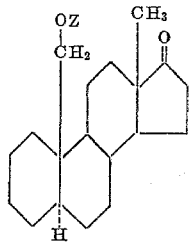

and

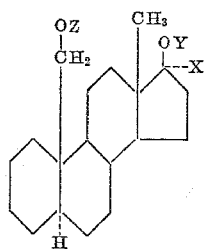

in which X is symbolic of hydrogen or a lower aliphatic hydrocarbon radical, and Y and Z can be either hydrogen or a radical represented by the formula $$-\overset{O}{\underset{\|}{C}}\text{-(lower alkyl)}$$

The term lower aliphatic hydrocarbon radical designated by X in the foregoing representation encompasses those groups more particularly defined by the following formulas $$C_nH_{2n+1}$$
$$C_nH_{2n-1}$$

and
$$C_nH_{2n-3}$$

in which $n$ is indicative of a positive integer from 1 to 7 inclusive. Examples of the groups envisaged are ethynyl, propenyl, allyl, crotyl, butynyl, methyl, isobutyl, secondary-propyl, pentenyl, hexynyl, heptyl, propargyl, neopentyl, heptynyl, vinyl, and heptenyl. The lower alkyl radicals encompassed by the Y and Z terms are those represented by the formula $$C_nH_{2n+1}$$

defined above, and are exemplified by methyl, ethyl, secondary-butyl, hexyl, and tertiary-heptyl.

The compounds of the present invention are conveniently produced from starting materials represented by the following structural formulas

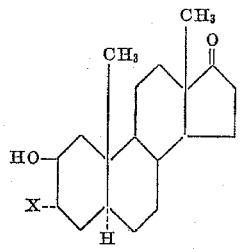

and

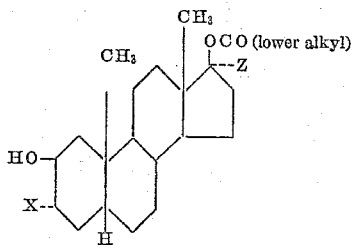

wherein X is a halogen of atomic weight less than 100, i.e., fluorine, chlorine, or bromine, and Z can be hydrogen or a lower aliphatic hydrocarbon radical. Those starting materials together with methods for their manufacture are disclosed in U.S. Patent 3,018,298, issued January 23, 1962. As described in our copending application Serial No. 293,839, filed July 9, 1963, oxidation of those halohydrins with a suitable reagent results in the corresponding 2β,19-epoxy compounds. Thus, a suitable process involves the reaction of 3α-bromo-2β-hydroxy-5α-androstan-17-one in carbon tetrachloride with lead tetraacetate and iodine to afford 3α-bromo-2β,19-epoxy-5α-androstan-17-one.

The latter 2β,19-epoxy intermediates can be converted to the corresponding 19-acetoxyandrost-2-enes by a process which involves the use of a reagent consisting of zinc and acetic acid. The process in question is typically conducted at the reflux temperature of the reaction mixture over a period of several hours. A specific example of the process involved is the reaction of 3α-bromo-2β,19-epoxy-5α-androstan-17-one with zinc and acetic acid, at the reflux temperature, to produce 19-acetoxy-5α-androst-2-en-17-one. The latter intermediate, upon catalytic hydrogenation in the presence of 5% palladium-on-carbon catalyst, affords the instant 19-acetoxy-5α-androstan-17-one. Reduction of the 17-keto group of that substance with lithium aluminum hydride in tetrahydrofuran results in 5α-androstane-17β,19-diol, while substitution of the reagent lithium tri-(tertiarybutoxy) aluminum hydride in that process leaves the ester group intact, thus affording 5α-androstane-17β,19-diol 19-acetate.

The 17α-(lower alkyl)-17β-hydroxy compounds of this invention are conveniently obtained by reaction of the instant 17-ones with the appropriate alkyl organometallic reagent. An example of that process is the reaction of 19-acetoxy-5α-androstan-17-one with methyl magnesium bromide in ether solution, thus resulting in 17α-methyl-5α-androstane-17β,19-diol.

Those derivatives possessing an unsaturated hydrocarbon grouping at the 17-position can be produced in an analogous manner by reacting the instant 17-keto substances with the desired organometallic reagent. When the aforementioned 19-acetoxy-5α-androstan-17-one is contacted with the 30% lithium acetylide-70% ethylene diamine complex, for example, 17α-ethynyl-5α-androstane-17β,19-diol is produced. An alternate method particularly suited to the manufacture of the 17α-(lower alkenyl) derivatives involves partial reduction of the corresponding 17α-(lower alkynyl) compounds. The instant 17α-vinyl-5α-androstane-17β,19-diol, typically, is obtained by hydrogenation of 17α-ethynyl-5α-androstane-17β,19-diol in the presence of a 5% palladium-on-carbon catalyst.

The instant 19-hydroxy derivatives are obtained upon hydrolysis of the aforementioned 19-acetoxy compounds and can be converted to the 19-(lower alkanoyl)oxy compounds of this invention by esterification with a suitable acylating agent such as a lower alkanoic acid anhydride or halide. That acylation reaction is preferably conducted in the presence of an acid acceptor such as triethylamine or pyridine. An example of those processes is the saponification of 19-acetoxy-5α-androstan-17-one with potassium hydroxide in aqueous methanol to afford 19-hydroxy-5α-androstan-17-one and the acylation of the latter 19-ol with propionic anhydride and pyridine, resulting in 19-propionoxy-5α-androstan-17-one. In a similar manner, 5α-androstane-17β,19-diol 19-acetate is acylated with acetic anhydride and pyridine to afford 5α-androstane-17β,19-diol 17,19-diacetate.

Those 17α-(lower alkyl)-17β-ols of this invention wherein the alkyl group has more than one carbon atom can be manufactured also by catalytic hydrogenation of the corresponding 17α-(lower alkynyl)-17β-ols. A specific example of the method involved is given by the hydrogenation of 17α-ethynyl-5α-androstane-17β,19-diol, typically with a 5% palladium-on-carbon catalyst, thus affording 17α-ethyl-5α-androstane-17β,19-diol.

In addition to the manufacturing processes described hereinbefore, the compounds of this invention in which no carbon-to-carbon unsaturated linkages exist, can alternatively be produced by catalytic hydrogenation of the corresponding 5α-androst-2-ene compounds. An example of the preferred procedure is given above, i.e., the conversion of 19-acetoxy-5α-androst-2-en-17-one to 19-acetoxy-5α-androstan-17-one by hydrogenation with a palladium catalyst.

The compounds of the present invention are useful as a result of their valuable antibiotic properties. They are anti-bacterial, anti-algal, and anti-protozoal agents, for example, as is evidenced by their ability to inhibit the growth of *Diplococcus pneumoniae*, *Chlorella vulgaris*, and *Tetrahymena gelleii*.

The invention will appear more fully from the examples which follow. These examples are set forth by way of illustration only, and it will be understood that the invention is not to be construed as limited in spirit or in scope by the details contained therein as many modifications in materials and methods will be apparent from the disclosure to those skilled in the art. In these examples, temperatures are given in degrees centigrade (°C.). Quantities of materials are expressed in parts by weight unless otherwise noted.

*Example 1*

To a solution of 18.5 parts of 3α-bromo-2β-hydroxy-5α-androstan-17-one in 1600 parts of carbon tetrachloride is added 67 parts of lead tetraacetate and 25.4 parts of iodine, and the resulting reaction mixture is heated at the reflux temperature for about 8 hours, then is allowed to stand at room temperature for about 16 hours. The mixture is filtered, and the filter cake is washed with methylene chloride. This organic solution is washed successively with 10% aqueous sodium thiosulfate and water, then is dried over anhydrous sodium sulfate and stripped of solvent at reduced pressure. The residue is dissolved in a 1:1 hexane-benzene solution, then is chromatographed on a silica gel column. The column is eluted, first with benzene then with benzene containing increasing amounts of ethyl acetate. The 5% ethyl acetate in benzene eluate affords a fraction which, after recrystallization from methanol, results in 3α-bromo-2β,19-epoxy-5α-androstan-17-one, melting at about 130–132°. It displays an optical rotation of +87° in chloroform.

*Example 2*

To a solution of 50 parts of 3α-bromo-2β,19-epoxy-5α-androstan-17-one in 525 parts of acetic acid is added 50 parts of zinc dust, and the resulting reaction mixture is heated at the reflux temperature with stirring for about 7 hours, then is allowed to cool to room temperature. The inorganic salts are removed by filtration and washed on the filter with isopropyl alcohol. The filtrate is poured slowly into approximately 3000 parts of cold water, and the resulting reaction mixture is stored at 0–5° for about 16 hours. The precipitated solid is collected by filtration, washed on the filter with water, and dried in air to yield crude 19-acetoxy-5α-androst-2-en-17-one, melting at about 71–72°. Recrystallization of that product from aqueous methanol affords needle-like crystals of the pure substance, melting at about 72–74°. This compound is characterized by an optical rotation of +107.5° in chloroform.

*Example 3*

To a solution of 1.5 parts of 19-acetoxy-5α-androst-2-en-17-one in 120 parts of ethanol is added 0.2 part of 5% palladium-on-carbon catalyst, and that mixture is shaken in a hydrogen atmosphere at atmospheric pressure and room temperature for about 3 hours, during which time one molecular equivalent of hydrogen is absorbed. The mixture is then filtered to remove the catalyst, and the filtrate is stripped of solvent at reduced pressure to afford an oily residue. That material is extracted with ether, and the ether solution is filtered, then evaporated to dryness to yield 19-acetoxy-5α-androstan-17-one, melting at about 48–50°. It possesses an optical rotation of +67.5° in chloroform and is represented by the structural formula

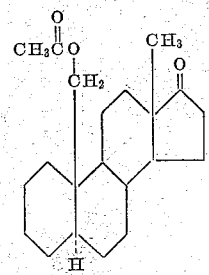

*Example 4*

A mixture of one part of 19-acetoxy-5α-androstan-17-one, 3 parts of lithium tri-(tertiary-butoxy) aluminum hydride, and 27 parts of tetrahydrofuran is stirred at 0–5° for about 1½ hours, then is poured into a mixture of ice and water. The precipitate which forms is collected by filtration, washed on the filter with water, and dried in air to afford the crude product. Crystallization of that solid from methanol containing decolorizing carbon affords pure 5α-androstane-17β,19-diol 19-acetate, melting at about 136–138°. It displays an optical rotation of +9° in chloroform and is represented by the structural formula

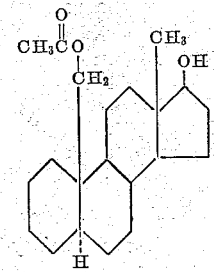

Example 5

To a solution of 25 parts by volume of ethereal 3 molar methyl magnesium bromide in 14 parts of ether is added a solution of one part of 19-acetoxy-5α-androstan-17-one in 49 parts of ether over a period of about 15 minutes. The reaction mixture is heated at the reflux temperature for about 16 hours, then is poured into a mixture of ice and water containing 30 parts of hydrochloric acid. That acidic mixture is extracted with ethyl acetate, and the organic layer is separated, washed with 5% aqueous sodium bicarbonate, and dried over anhydrous potassium carbonate containing decolorizing carbon. Removal of the solvent by distillation at reduced pressure affords a white solid which is recrystallized from acetone-hexane to produce 17α-methyl-5α-androstane-17β,19-diol, melting at about 169–171°. An optical rotation of −2° is observed in chloroform. This compound can be represented by the structural formula

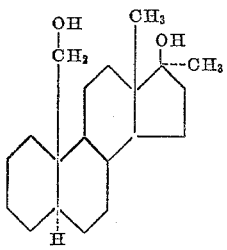

Example 6

To a slurry of one part of lithium aluminum hydride in 31.5 parts of tetrahydrofuran is added dropwise, at room temperature with stirring, a solution of 1.1 parts of 19-acetoxy-5α-androstan-17-one in 31.5 parts of tetrahydrofuran, and the resulting reaction mixture is heated at the reflux temperature for about 3 hours, then is allowed to stand at room temperature for about 16 hours. The unreacted reagent is decomposed by the successive addition of 30 parts of dioxane containing one part of water, 0.75 part by volume of 20% aqueous sodium hydroxide, and 3.5 parts of water. The insoluble salts which precipitate are removed by filtration and washed on the filter with dioxane. The filtrate is concentrated to dryness at reduced pressure to afford a solid residue which is recrystallized from aqueous methanol, resulting in pure 5α-androstane-17β,19-diol, melting at about 170–172°. It displays an optical rotation of +20.5° in chloroform and is further characterized by the structural formula

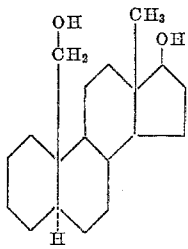

Example 7

To a solution of 3.5 parts of the 30% lithium acetylide–70% ethylene diamine complex in 31.5 parts of tetrahydrofuran is added at room temperature with stirring, in a nitrogen atmosphere, a solution of 1.1 parts of 19-acetoxy-5α-androstan-17-one in 31.5 parts of tetrahydrofuran. Stirring at room temperature is continued for about 2 hours, after which time the mixture is allowed to stand at that temperature for about 16 hours. The reaction mixture is quenched by pouring slowly into approximately 200 parts by volume of 10% aqueous ammonium chloride containing cracked ice, and that aqueous mixture is then made acidic by the addition of dilute hydrochloric acid. The precipitate which forms is isolated by filtration, is then washed on the filter with water, and is finally extracted into ether. That organic solution is dried over anhydrous sodium sulfate containing decolorizing carbon, and the solvent is removed by distillation at reduced pressure. The residual solid thus obtained is recrystallized from aqueous methanol, resulting in pure 17α-ethynyl-5α-androstane-17β,19-diol, characterized by a melting point at about 71–74° and, in addition, by an optical rotation of −30.5° in chloroform. Its structure is shown by the following representation

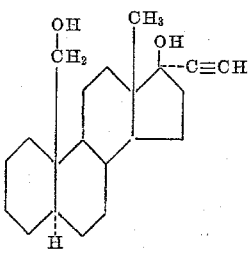

Example 8

To a mixture of 7.5 parts of 5α-androstane-17β,19-diol 19-acetate with 100 parts of pyridine is added 50 parts of acetic anhydride, and the resulting mixture is allowed to react at room temperature over a period of about 16 hours. It is then poured into a mixture of ice and water, resulting in formation of an oily precipitate. That material is isolated by filtration, and the filter cake is washed with water. Purification of that crude product is effected by recrystallization from aqueous methanol, thus affording 5α-androstane-17α,19-diol 17,19-diacetate which exhibits a melting point at about 77.5–78.5° and is further characterized by the following structural representation

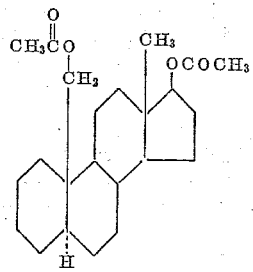

Example 9

To a solution of 1.75 parts of 17α-ethynyl-5α-androstane-17β,19-diol in 200 parts of 95% ethanol is added 0.2 part of 5% palladium-on-carbon catalyst, and that hydrogenation mixture is shaken in a hydrogen atmosphere at room temperature and atmospheric pressure until there is no further uptake of gas. The reaction mixture is then filtered in order to separate the catalyst, and the catalyst is washed on the filter with ethanol. The filtrate is submitted to distillation at reduced pressure, and the solid crude product which remains is recrystallized from aqueous ethanol, thus affording pure 17α-ethyl-5α-androstane-17β,19-diol. This substance is characterized by a melting point at about 141–143° and displays an optical rotation of +8° in chloroform. It is structurally illustrated by the following formula

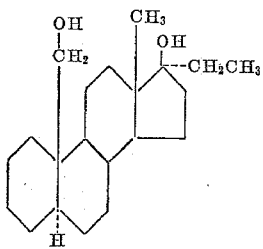

Example 10

To a solution of 9 parts of 17α-ethynyl-5α-androstane-17β,19-diol in 1500 parts of pyridine is added one part of 5% palladium-on-carbon catalyst, and that mixture is shaken with hydrogen at atmospheric pressure and room temperature until such time as the uptake of one molecular equivalent of hydrogen is completed. The catalyst is separated from the mixture by filtration and is washed well on the filter with ethanol. Concentration of the filtrate to approximately ½ the original volume by distillation at reduced pressure followed by dilution of that solution with water and cooling at 0–5° results in precipitation of the crude product, which is isolated by filtration and washed well on the filter with water. That crude material is purified by recrystallization from aqueous methanol to afford pure 17α-vinyl-5α-androstane-17β,19-diol hemihydrate, displaying a melting point at about 142–145° and characterized also by an optical rotation of +46° in chloroform. This substance can be represented by the structural formula

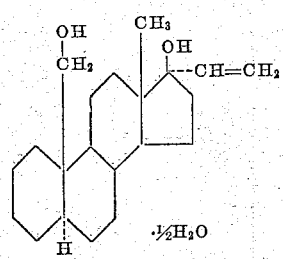

Example 11

A solution of 6 parts of 1-butyne in 40 parts of cold ether is added portion wise, in the course of about 30 minutes, to a solution of butyllithium, which is prepared from 17.3 parts of 1-bromobutane and 2.2 parts of lithium wire in 27 parts of ether. After completion of the addition, this mixture is stirred for about 90 minutes at about 0°. To the resulting ethereal solution of butynyl lithium is then added, over a period of about 30 minutes, a solution of 11.7 parts of 19-acetoxy-5α-androstan-17-one in 100 parts of tetrahydrofuran. After completion of the addition, the ether is removed by distillation, keeping the volume essentially constant by the addition of tetrahydrofuran. That mixture is then heated at the reflux temperature for about 3 hours, following which period of time it is poured into water, and the aqueous mixture which results is cooled at 0–5°. The resulting oily layer is extracted into ether, and organic solution is washed successively with water and saturated aqueous sodium chloride, then is dried over anhydrous sodium sulfate and concentrated to dryness under reduced pressure to yield 17α-(1-butynyl)-5α-androstane-17β,19-diol, represented by the structural formula

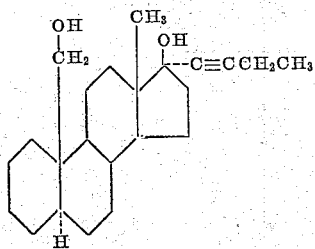

Example 12

The partial reduction of 9.8 parts of 17α-(1-butynyl)-5α-androstane-17β,19-diol according to the procedure described in Example 10 results in 17α-(1-butenyl)-5α-androstane-17β,19-diol, characterized by the following structural representation

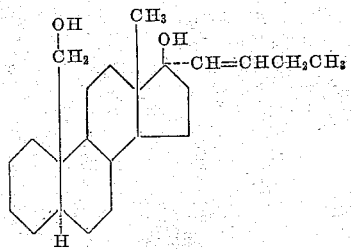

Example 13

To a solution of 4.1 parts of 19-acetoxy-5α-androstan-17-one in 40 parts of methanol containing 2 parts of water is added one part of potassium hydroxide, and that reaction mixture is heated at the reflux temperature for about 3 hours. After standing for about 16 hours longer at room temperature, the mixture is poured slowly into cold water, then is cooled at 0–5° for about 30 minutes. The crude product which precipitates is isolated by filtration, then is washed on the filter with water, and finally is dried in air. That solid material is purified by crystallization from acetone-hexane to afford 19-hydroxy-5α-androstan-17-one, characterized by the following structural formula

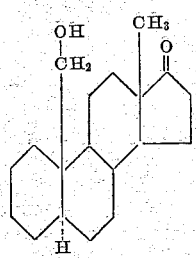

Example 14

A mixture containing 3 parts of 19-hydroxy-5α-androstan-17-one, 19.5 parts of propionic anhydride, and 30 parts of pyridine is shaken to afford a clear solution which is then stored at room temperature for about 16 hours. At the end of that time, the mixture is carefully diluted with water, and that diluted aqueous mixture is extracted with ether. The organic layer is separated, washed successively with water, dilute hydrochloric acid, and water, then dried over anhydrous sodium sulfate and concentrated to dryness under reduced pressure, resulting in 19-propionoxy-5α-androstan-17-one of the structural formula

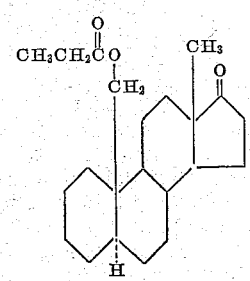

Example 15

By substituting 1.04 parts of 19-propionoxy-5α-androstan-17-one and otherwise proceeding according to the processes described in Example 4, 5α-androstane-17β,19-diol 19-propionate, represented by the structural formula

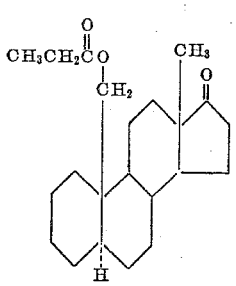

is produced.

Example 16

The reaction of 7.8 parts of 5α-androstane-17β,19-diol with 64.7 parts of propionic anhydride and 100 parts of pyridine by the procedure described in Example 8 results in 5α-androstane-17β,19-diol 17,19-dipropionate of the structural formula

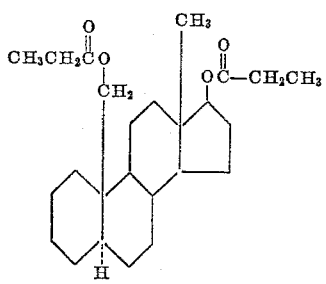

Example 17

The reaction of 6.9 parts of 17α-methyl-5α-androstane-17β,19-diol with acetic anhydride and pyridine by the procedure described in Example 8 results in 17α-methyl-5α-androstane-17β,19-diol 19-acetate, represented by the structural formula

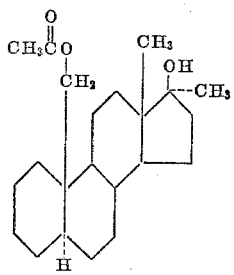

Example 18

The substitution of 7.1 parts of 17α-ethynyl-5α-androstane-17β,19-diol for 5α-androstane-17β,19-diol 19-acetate in the processes of Example 8 affords 17α-ethynyl-5α-androstane-17β,19-diol 19-acetate, characterized by the following structural representation

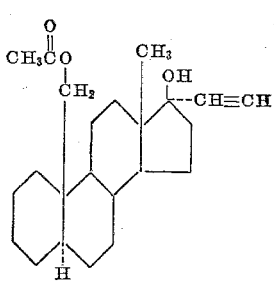

Example 19

When 7.1 parts of 17α-vinyl-5α-androstane-17β,19-diol is allowed to react with acetic anhydride and pyridine by the method disclosed in Example 8, 17α-vinyl-5α-androstane-17β,19-diol 19-acetate is produced. It is represented by the following structural formula

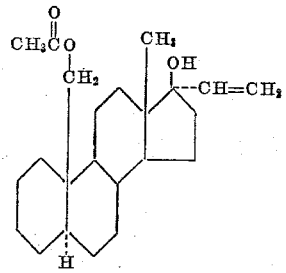

What is claimed is:

1. A member selected from the class consisting of compounds represented by the formulas

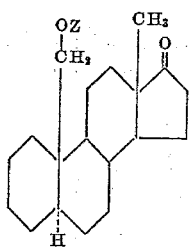

and

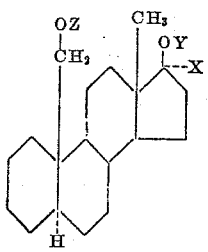

wherein X is selected from the group consisting of hydrogen and a lower aliphatic hydrocarbon radical, Y is hydrogen when X is a lower aliphatic hydrocarbon radical, Y is selected from the group consisting of hydrogen and

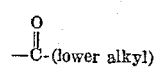

radicals when X is hydrogen, and Z is a member of the class consisting of hydrogen and

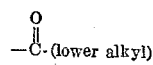

radicals.

2. 5α-androstane-17β,19-diol.

3. A compound of the formula
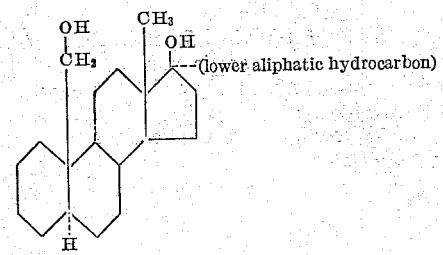
4. 17α-methyl-5α-androstane-17β,19-diol.
5. 17α-ethyl-5α-androstane-17β,19-diol.
6. 17α-ethynyl-5α-androstane-17β,19-diol.
7. 17α-vinyl-5α-androstane-17β,19-diol.
8. A compound of the formula
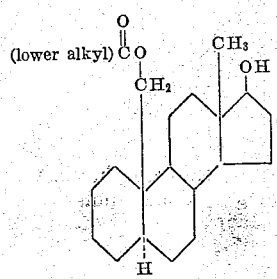
9. 5α-androstane-17β,19-diol 19-acetate.
10. A compound of the formula
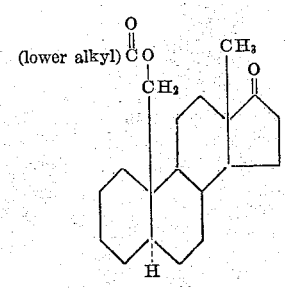
11. 5α-androstane-17β,19-diol 17,19-diacetate.
12. A compound of the formula
13. 19-acetoxy-5α-androstan-17-one.
No references cited.
LEWIS GOTTS, *Primary Examiner.*